United States Patent [19]

Albright et al.

[11] 3,959,401

[45] *May 25, 1976

[54] PROCESS FOR CRACKING

[75] Inventors: Charles W. Albright; George E. Keller, II, both of South Charleston, W. Va.

[73] Assignee: Union Carbide Corporation, New York, N.Y.

[ * ] Notice: The portion of the term of this patent subsequent to Nov. 19, 1991, has been disclaimed.

[22] Filed: Dec. 13, 1974

[21] Appl. No.: 532,727

Related U.S. Application Data

[63] Continuation of Ser. No. 359,675, May 14, 1973, abandoned, which is a continuation-in-part of Ser. No. 252,511, May 8, 1972, abandoned.

[52] U.S. Cl. .......................... 260/683 R; 208/128; 208/130; 260/683 D
[51] Int. Cl.² .................................................. C07C 3/08
[58] Field of Search ........ 260/683 R, 683 P, 683 D; 208/128, 130

[56] References Cited
UNITED STATES PATENTS

| | | | |
|---|---|---|---|
| 2,413,407 | 12/1946 | Dreyfus | 260/683 |
| 2,636,688 | 4/1953 | Singh | 48/DIG. 4 |
| 2,763,699 | 9/1956 | Van Dijk et al. | 260/683 |
| 2,941,021 | 6/1960 | Krause et al. | 260/683 |
| 2,942,043 | 6/1960 | Rummert | 260/683 |
| 3,005,857 | 10/1961 | Steinhofer et al. | 260/683 |
| 3,098,883 | 7/1963 | Heuse et al. | 260/683 |
| 3,213,015 | 10/1965 | Atkinson et al. | 208/130 |
| 3,351,427 | 11/1967 | Wendell et al. | 23/277 |
| 3,498,753 | 3/1970 | Hokari et al. | 23/277 |
| 3,527,586 | 9/1970 | Pettit | 260/683 |
| 3,714,283 | 1/1973 | Rice et al. | 260/683 |

*Primary Examiner*—Delbert E. Gantz
*Assistant Examiner*—C. E. Spresser
*Attorney, Agent, or Firm*—Marylin Klosty

[57] ABSTRACT

A process for cracking hydrocarbon feedstocks comprising introducing a mixture of feedstock and hot gas into a reactor in which cracking temperatures are maintained, said reactor comprising;

A. a hollow cylindrical tube having (i) a first end closure and a second end closure, at least one of said end closures being provided with an orifice disposed substantially centrally therein; and (ii) at least one hollow inlet feed chamber open at both ends passing through the cylindrical surface described by tube (A), one end of such feed chamber being disposed in the interior of tube (A) at about its periphery in such a manner that vapor, which is passed through said chamber, will flow substantially tangentially to the inner surface described by cylindrical tube (A), provided that the rate of flow is sufficient therefor, creating a vortex-like flow within tube (A); and B. at least one hollow tube open at both ends;

wherein:

a. one end of tube (B) is connected to tube (A) at its orifice in substantially concentric alignment therewith and in open communication with tube (A);

b. tube (A) has a length to diameter ratio of about 0.01:1 to about 1:1;

c. the ratio of the equivalent diameter of the orifice of tube (A) to the equivalent diameter of tube (B) is about 1:1 to about 0.1:1.

d. tube (B) has a length to equivalent diameter ratio of about 5:1 to about 200:1; and e. the ratio of the volume of tube (A) to the volume of tube (B) is about 0.01 to about 5:1.

7 Claims, 4 Drawing Figures

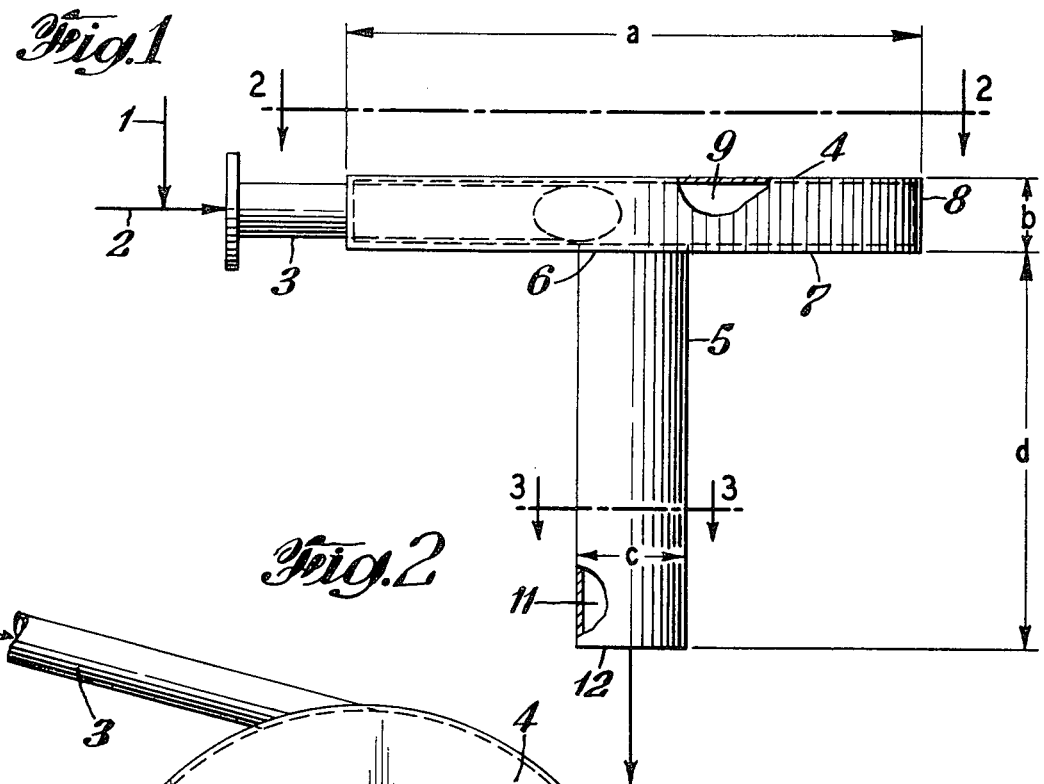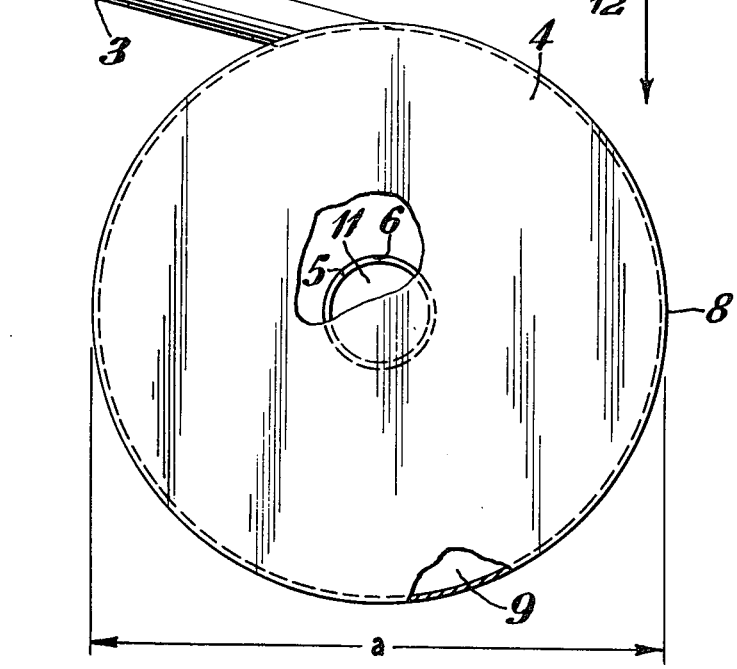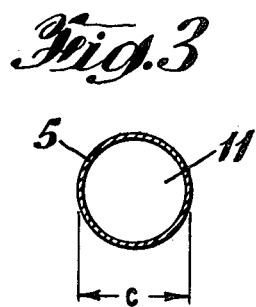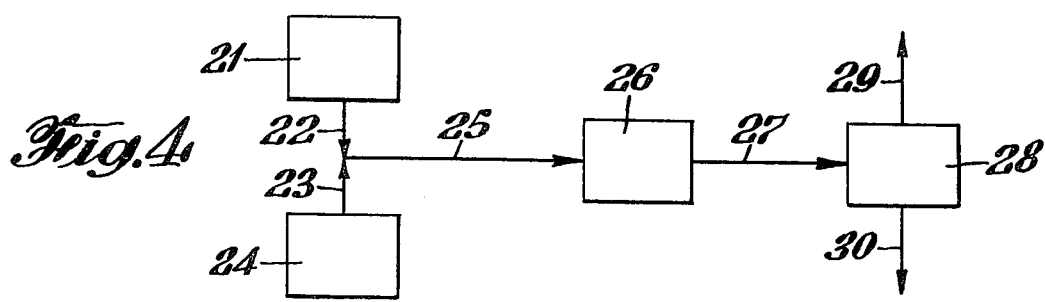

PROCESS FOR CRACKING

This is a continuation of application Ser. No. 359,675 filed May 14, 1973, now abandoned which is a continuation-in-part of application Ser. No. 252,511, filed on May 8, 1972, and now abandoned.

FIELD OF THE INVENTION

This invention relates to an improvement in the systems presently used for the thermal cracking of hydrocarbons with hot gases and, more particularly, to an improved cracking reactor for such systems.

DESCRIPTION OF THE PRIOR ART

Thermal cracking of hydrocarbon feedstocks has for many years been a major source for supplying the needs of the chemical industry with the most basic of chemicals such as ethylene and propylene, the former being used chiefly in the production of low and high density polyethylene, ethylene oxide and vinyl chloride, and the latter for the production of isopropyl alcohol, acrylonitrile, polypropylene and propylene oxide.

Natural gas, or various components thereof, and naphtha are currently the major feedstocks from which ethylene, propylene, and acetylene are derived by thermal cracking; however, shortages of these feedstocks at reasonable cost suggest that industry will eventually have to turn to crude oil or heavier materials in their stead.

One method of thermal cracking involves introducing liquid feedstock into a reactor in atomized form together with superheated steam and/or another hot gas, which supplies the heat necessary for the endothermic cracking reaction. The introduction of the feedstock and hot gas is accomplished in such a manner that the components are thoroughly mixed and the high temperature is uniformly and rapidly established throughout the incoming feedstock.

The main drawbacks in present thermal cracking techniques center in the available reactors in that they are not versatile, i.e., these reactors do not accept a variety of liquid feedstocks such as naphthas, gas oils, natural gasolines, raffinates, and their component hydrocarbons, which are currently being used as feedstocks and will continue to be used for many years, together with crude oil and possibly even heavier materials, which will be used more and more in the future, and, further, present reactors do not have the capability of providing high yields of ethylene, propylene and acetylene regardless of the choice of feedstock. This simply means that because of the current transitional nature of the economics affecting feedstocks, highly specialized reactors, which only accept limited kinds of feedstocks are not presently attractive investment-wise. Rather, to be commercially advantageous, a reactor must have sufficient flexibility to accept the feedstock which is considered to be the most economic at the time whether, e.g., it is naphtha or crude oil, and provide good yields from either.

To date, the provision of high yield reactors for thermally cracking a variety of liquid feedstocks, all at high yields, has proved elusive especially when both naphtha and crude oil must be included in their repertoire.

SUMMARY OF THE INVENTION

An object of this invention, therefore, is to provide a reactor which, using conventional processes, is capable of cracking a variety of hydrocarbon feedstocks, particularly naptha, gas oil, and crude oil, to ethylene, propylene and acetylene in high yield.

Other objects and advantages will become apparent hereinafter.

According to the present invention, a process has been discovered for cracking hydrocarbon feedstocks comprising introducing a mixture of feedstock and hot gas into a reactor in which cracking temperatures are maintained, said reactor comprising:

A. a hollow cylindrical tube having (i) a first end closure and a second end closure, at least one of said end closures being provided with an orifice disposed substantially centrally therein; and (ii) at least one hollow inlet feed chamber open at both ends passing through the cylindrical surface described by tube (A), one end of said feed chamber being disposed in the interior of the tube at about its periphery in such a manner that vapor, which is passed through said chamber, will flow substantially tangentially to the inner surface described by cylindrical tube (A), provided that the rate of flow is sufficient therefor, creating a vortex-like flow within tube (A); and B. at least one hollow tube open at both ends;
wherein;
a. one end of tube (B) is connected to tube (A) at its orifice is substantially concentric alignment therewith and in open communication with tube (A);
b. tube (A) has a length to diameter ratio of about 0.01:1 to about 1:1;
c. the ratio of the equivalent diameter of the orifice of tube (A) to the equivalent diameter of tube (B) is about 1:1 to about 0.1:1.
d. tube (B) has a length to equivalent diameter ratio of about 5:1 to about 200:1, and
e. the ratio of the volume of tube (A) to the volume of tube (B) is about 0.01:1 to about 5:1.

BRIEF DESCRIPTION OF THE DRAWING

FIG. 1 is a schematic side view cross section of a reactor embodying the invention.

FIG. 2 is a schematic plan view taken along line 2—2 of FIG. 1.

FIG. 3 is a schematic plan view taken along line 3—3 of FIG. 1.

It should be noted that the relative dimensions of the parts of the reactor in FIGS. 1 to 3 do not conform to the ratios prescribed in the specification.

FIG. 4 is a schematic flow diagram illustrating a conventional system in which a reactor embodying the invention can be used.

DESCRIPTION OF THE PREFERRED EMBODIMENT

The reactor can be made from various materials, the preferred material being stainless steel, e.g., AISI type 316 stainless steel. Other representative materials from which the reactor can be made are AISI types 304 and 347 stainless steel; an alloy containing approximately 76% nickel, 16% chrome, and 6% iron; as well as various ceramics with high-temperature stability.

The thickness of the reactor walls can be decided upon conventional lines and is not critical to the invention. Temperatures, pressures, longevity, economics, and available materials should be considered when making the decision.

Referring to the drawing:

It will be apparent from the drawing that the preferred embodiment of the reactor described here can be called a disc and tube reactor and subsequent references made in the descripton may refer to the disc portion of the reaction or the tube portion of the reactor.

Atomized liquid feedstock passes through line 1 and joins line 2 through which is flowing a hot gas such as superheated steam. Lines 1 and 2 are conventional parts of the entire cracking system and not essential parts of the reactor. The mixture enters inlet feed chamber 3 and then passes into interior 9 of the disc portion of the reactor.

Inlet feed chamber (or inlet tube) 3 is disposed in the interior 9 near the interior surface of wall 8, which describes a hollow cylindrical tube.

There can be one or more inlets depending on the size of the reactor and the feed input per unit time desired, all placed in a similar manner to chamber 3, preferably at points equally spaced on either side from one another along wall 8. Thus two inlets can be connected through wall 8 at points along its circumference representing 180° and 360°C, respectively; three inlets at points along wall 8 representing 120°, 240°, and 360°, respectively; and four inlets along the circumference at 90°, 180°, 270°, and 360°, respectively.

The disposition of chamber 3, and similar tubes, near the interior surface of wall 8 is preferably essentially tangential; however, such disposition is best defined by stating that it is disposed in such a manner that gas flowing from the chamber can flow substantially tangentially to the interior surface of wall 8 creating a vortex-like flow in the disc portion of the reactor. The size and shape of the chamber, the rate of flow of the feedstock/hot gas mixture, and the direction of flow will have to be considered by the technician in achieving tangential and vortex-like flow in the disc. In practice, the inlet chamber is a tube with openings at both ends placed in a fixed position in the disc so that its theoretical axis is tangential to the inner surface of the wall, in this case, wall 8 and the rate of flow is controlled to achieve the tangential and vortex-like flow.

Although chamber 3 is preferably disposed through wall 8 as shown in the drawing, it can be disposed through top side 4 or bottom side 7 and still achieve a modicum of tangential flow together with vortex-like flow. Although such a disposition is contemplated, it is not the preferred way of carrying out the invention in view of the irregularities of the flow.

Circular wall (or hollow cylindrical tube) 8 has a closure on each end which can be called top side 4 and bottom side 7. Top side 4 is a flat circular surface with no openings, attached to and bounded by wall 8.

Bottom side 7 is also a flat circular surface attached to and bounded by wall 8 having disposed substantially centrally therein orifice 6.

The mixture, which now comprises partially cracked feedstock, its cracked derivatives, and steam, and/or other hot gas, passes from the disc portion of the reactor through orifice 6 into interior 11 of the hollow tube portion of the reactor. Wall 5 describes the hollow tube of the tube portion which is open at both ends. The tube is in open communication with the disc through orifice 6. Wall 5 can be connected to bottom end 7 at the boundaries of orifice 6 or, if the diameter of the tube is greater than the orifice, wall 5 can be connected at other points on bottom end 7. In any case, the center of the tube is substantially aligned with the center of the orifice.

The cross-section of the hollow tube can be a variety of shapes although a cylindrical cross-section is preferred. It can, for example, be square, rectangular, triangular, pentagonal, hexagonal, or elliptical, although a mixture of these cross-sections in the same tube is not recommended. The tube can also be a helical coil, which is of value if the space available will not accommodate a straight tube. The end of the tube opposite to the tube's connection to the disc at orifice 6 is outlet 12 through which the reactor is in open communication with the downstream portion of the system and, after cracking is essentially completed in the tube portion, the effluent proceeds through this outlet.

Certain ratios concerning dimensions and volumes are critical to the invention. For the purpose of setting out these ratios, the disc portion of the reactor will be referred to as tube (A) and the tube portion of the reactor as tube (B). The important dimensions are as follows:

$a$ = the diameter of tube (A), the disc portion of the reactor. This dimension can also be referred to as the diameter of the cylindrical tube bounded by wall 8.

$b$ = the length of tube (A). This dimension can also be referred to as the height of wall 8.

$c$ = the equivalent diameter of tube (B), the tube portion of the reactor. This dimension can also be referred to insofar as the drawing is concerned as the diameter of the cylindrical tube bounded by wall 5.

$d$ = the length of tube (B). This dimension can also be referred to as the height of wall 5.

The dimension of orifice 6 is not shown in the drawing since it coincides with dimension $c$ therein. This dimension can, however, be different from dimension $c$ and will be referred to hereinafter as the equivalent diameter of the orifice of tube (A).

It should be noted that dimensions $a$, $b$, and $c$ are outer dimensions which include the thickness of the reactor walls. This was an arbitrary selection, i.e., interior dimensions could have just as well been used.

Equivalent diameter is used to describe dimension $c$ and the dimension of orifice 6 simply because the tube and orifice do not have to be cylindrical cross-sections, but can take on a variety of shapes. Various kinds of shapes were mentioned heretofore for the tube and this is applicable to the orifice also. Equivalent diameter is a convenient way of defining both non-cylindrical cross-sections and cylindrical cross-sections with one term. The mathematical abbreviation for equivalent diameter is $D_{eq}$ and the equation defining this term is as follows:

$$D_{eq} = \frac{4 \times \text{cross-sectional area}}{\text{perimeter of cross-sectional area}}$$

Where the cross-sectional area of the tube varies along its length an average equivalent diameter can be used, but tubes of varying cross-section are considered impractical and are not recommended. The shape of the orifice can be different from that of the tube, however, without creating any impracticalities.

The critical ratios are as follows:

1. Tube (A) can have a length (b) to diameter (a) ratio in the range of about 0.01:1 to about 1:1 and such ratio is preferably in the range of about 0.03:1 to about 1:1.

2. The ratio of the equivalent diameter of the orifice of tube (A) to the equivalent diameter (c) of tube (B) can be in the range of about 1:1 to about 0.1:1 and is preferably in the range of about 1:1 to about 0.25:1.

3. Tube (B) can have a length (d) to equivalent diameter (c) ratio in the range of about 5:1 to about 200:1 and such ratio is preferably in the range of about 10:1 to about 100:1.

4. The ratio of the volume of tube (A) to the volume of tube (B) can be in the range of about 0.01:1 to about 5:1 and is preferably in the range of about 0.01:1 to about 2.5:1.

Volume of tube (A) or tube (B) is defined by the following equation:

$$\text{Volume} = (\pi) \left( \frac{\text{diameter or equivalent diameter}}{2} \right)^2 (\text{length})$$

The actual dimensions of the reactor vary according to the use to which the reactor is to be put, e.g., laboratory, pilot plant, or commercial use and, even more so, according to the amount of throughput desired. The number of inlet feed chambers, the number of tube portions, i.e., one or two, and the number of reactors along with many ancillary factors such as the particular economics of the situation must all be considered. An illustration of the range of dimensions, which would be desirable for a feedstock throughput of 50 to 100 pounds per hour, using one inlet feed chamber and one tube portion, is as follows:

| Dimension | Value in Inches |
|---|---|
| a | 12 to 16 |
| b | 0.4 to 1 |
| c | 1 to 2 |
| d | 30 to 70 |
| of orifice | 0.5 to 2 |

As stated heretofore, FIG. 4 is a schematic flow diagram illustrating a conventional system in which a reactor embodying the invention can be used.

Referring to FIG. 4 of the drawing:

Zone 21 represents the source of the feed stock and includes a preheating section where the feed is preheated to a temperature in the range of about 100° to about 700°C. and preferably in the range of about 200° to about 600°C.

The feedstock which can be used in the above described reactor and the system described here can be liquid provided that it is atomized prior to its introduction into the reactor. The feedstock can also be gaseous. Examples of liquid feedstocks include naphtha, crude oil, gas oil, natural gasoline, various raffinates and the various liquid hydrocarbon components of the various feedstocks such as pentanes of hexanes.

The preferred feedstocks in this system are naphtha, gas oil, and crude oil, the efficient cracking of which is an object of this invention. Examples of gaseous feedstocks are natural gas, synthetic natural gas and various gaseous hydrocarbon components such as ethane, propane, and butanes.

The most noteworthy characteristic of the instant cracking reactor is its ability to accept and process high boiling fractions, which cannot be vaporized at 500°C. at normal pressures. These fractions are, of course, major constituents of crude oil.

The feed passes along line 22, which corresponds to line 1 in FIG. 1, and joins line 23, which in part corresponds to line 2 in FIG. 1. Line 23 is carrying a hot gas from zone 24 which represents a hot gas source. The temperature of the hot gas is in the range of about 1000° to about 3000°C. and is preferably in the range of 1200° to about 2500°C. The hot gases which can be used to crack the feedstock are exemplified by superheated steam, which is preferred, or products of combustion of various fuels.

The ratio of hot gas to feedstock lies in the range of about 0.5 parts by weight of hot gas per part by weight of feedstock to about 5 parts by weight of hot gas per part by weight of feedstock and is preferably in the range of about 0.7 parts by weight of hot gas per part by weight of feedstock to about 2.5 parts by weight of hot gas per part by weight of feedstock.

The mixture of preheated feed and hot gas proceeds along line 25, which corresponds to the remaining length of line 2 in FIG. 1, into reactor 26 heretofore described.

Cracking is effected in subject reactor under the following conditions:

Temperatures in the disc portion of the reactor are in the range of about 500° to about 1200°C. and are preferably in the range of about 600° to about 1100°C. Temperatures at the outlet of the tube portion of the reactor are in the range of about 450° to about 1150°C. and are preferably in the range of about 550° to about 1050°C.

Pressures are in the range of about 1 atmosphere to about 10 atmospheres and are preferably in the range of about 1 atmosphere to about 5 atmospheres.

Residence time is maintained within the range of about 0.005 seconds to about 0.5 seconds and is preferably in the range of about 0.01 seconds to about 0.2 seconds.

The reactor effluent passes from reactor 26 along line 27 into quench zone 28. Water or a hydrocarbon stream is used to quench the effluent. Separation of the effluent takes place in this zone with the gas product going overhead along line 29 and the water and liquid product being taken off as bottoms through line 30. Again, separation, recovery and analysis are conventional.

The prior discussion has considered the use of both liquid and gaseous feedstocks in the abovedescribed reactor. Its versatility goes beyond these feedstocks, however, e.g., oxygenated materials such as alcohols and acids, various polymeric materials, and Diels-Alder products can also be effectively cracked therein.

Another embodiment of the described reactor concerns the use of two tube portions connected to the disc portion rather than just one. The second tube portion is connected to the disc portion in the same manner as the tube portion described above except that, in terms of FIG. 1, the connection would be to top side 4 at an orifice similar to orifice 6 disposed in that side. All ratios would be the same for this tube portion as for the tube portion heretofore described. The only change would be the step up in rate of flow of feedstock and hot gas and the preferable use of multiple inlet feed chambers. The outlets of both tube portions can be connected to one downstream system or two of such systems.

The following examples illustrate the invention. Parts and percentages are by weight unless otherwise designated.

EXAMPLE 1

The system and reactor heretofore described are used in this example. More specifically, the procedure followed and the conditions used are as follows:

Initially, a steam generating system is started first by increasing natural gas flow to a furnace and turning on a water pump. A high steam generation rate is used on startup to rapidly heat up the associated piping. The water rate is then adjusted to that required to meet the test conditions. Approximately one hour is required for the steam generation conditions to stabilize after adjustment because of the large volume of the steam generating coils. When the steam generation system is at the desired conditions, steam is turned into the mixing section to preheat the reaction system.

When the burner and reactor are at or above the saturation steam temperature the burner is readied for ignition. Hydrogen is used as fuel for the burner. The burner and reactor are first purged with nitrogen to be sure no combustibles are present. The burner is then ignited. Hydrogen and oxygen flows to the burner are controlled in the proportion for proper combustion, both streams being increased simultaneously to raise the reactor temperature. The function of the burner is to provide a heat source to supply the required sensible heat and heat of reaction.

When the reactor is heated almost to operating temperature, the feed pump is turned on. The hydrocarbon feed is admitted near the outlet of the mixing section where it is mixed with the steam and the mixture passes into what is designated as inlet feed chamber 3 in FIGS. 1 and 2 of the drawing. This inlet feed chamber 3 is attached so that its theoretical axis is tangential to the interior surface of the reactor wall 8. Reactor temperature, feed rate, water rate, and combustion rate are controlled to provide tangential flow of the feed/steam mixture and to give the desired residence time.

The reactor effluent is quenched with water to condense residual oils and a major proportion of the steam (about 80 percent by weight). Quench water rate is controlled to maintain the temperature of the steam leaving the quenched zone at 70°C.

The gaseous product leaving the quench zone or separator is cooled to ambient temperature in a condenser. Condensed hydrocarbons and water are collected and the make gas is flared.

Analysis of the products is by gas chromatograph and Mass Spectrometer gas analysis.

The outer dimensions of the reactor used in this example are as follows:

The disc portion, i.e., tube (A), has a length of 0.5 inch and a diameter of 14 inches for a length to diameter ratio of 0.5:14 or 0.036:1.

The tube portion, i.e., tube (B) is a helical coil of cylindrical cross-section having a length of 54 inches and a diameter of 1.5 inches for a length to diameter ratio of 54:1.5 or 36:1.

The volume of tube (A) is $(\pi) (7)^2 (0.5)$ or 77 cubic inches.

The volume of tube (B) is $(\pi) (0.75)^2 (54)$ or 95 cubic inches.

The ratio of the volume of tube (A) to the volume of tube (B) is, therefore, 77:95 or 0:81:1.

The total volume of tubes (A) and (B) is 172 cubic inches or 2820 cubic centimeters.

The ratio of the diameter of the orifice of tube (A) to the diameter of tube (B), both of which are circular cross-sections, is 1:1.

The feedstock is designated as "Texaco" naphtha having the following analysis:

Mass Spectrometer Analysis:

| Normal Paraffins | 39.49 percent |
|---|---|
| Iso Paraffins | 38.61 percent |
| Olefins | 1.36 percent |
| Naphthenes | 13.39 percent |
| Aromatics | 7.16 percent |

ASTM Distillation (ASTM no. D-86):

| Percent overhead | Temperature(°F.) |
|---|---|
| — | 104 (initial boiling point) |
| 10 | 146 |
| 20 | 167 |
| 30 | 188 |
| 40 | 206 |
| 50 | 226 |
| 60 | 248 |
| 70 | 256 |
| 80 | 287 |
| 90 | 312 |

End point: 370° F.
Recovery: 98.5 percent
Residue: 0.5 milliliters
API Gravity: 65.9 at 60°F.
Specific Gravity: 0.717 at 60°F.
Refractive Index: 1.3984 at 25°C.
ppm sulfur: 30
Bromine number: 1.02
H/C, calculated for physical properties: 2.160
Molecular weight via ASTM distillation + API gravity: 99
API = American Petroleum Institute
ppm = parts per million
H/C = hydrogen:carbon mol ratio
Operating conditions:
Reactor temperature: 840°C. in disc portion and 835°C. at outlet of tube portion.
Steam dilution ratio (by weight): 1.9 parts of steam per one part of feedstock.
Residence time (seconds): 0.056
Rate of hydrocarbon feed: 75 pounds per hour
Rate of steam feed: 140 pounds per hour
Reactor pressure: 10 pounds per square inch gauge
Results:

| Yield in percent by weight | |
|---|---|
| ethylene | 35.4 |
| propylene | 14.1 |
| acetylene | 1.5 |
| methane | 11.6 |
| total gas product | 77.9 |
| oil + coke | 22.1 |

EXAMPLE 2

Example 1 is repeated in the following four runs except for the change in conditions noted:

| Run | Feedstock | Reactor Temperature (°C.) Disc portion | outlet of tube portion | Steam dilution ratio (by weight) parts of steam per one part of feedstock | Residence time (seconds) |
|---|---|---|---|---|---|
| (a) | Lagomedio crude oil | 875 | 860 | 2.2:1 | 0.050 |
| (b) | Pennsylvania crude oil | 875 | 845 | 3.0:1 | 0.050 |
| (c) | Minas crude oil | 875 | 850 | 2.0:1 | 0.050 |
| (d) | Libyan crude oil | 875 | 855 | 2.0:1 | 0.050 |

The results are similar as for example 1.

The reactor of this invention is considered especially useful in pollution control particularly in its handling of plastic wastes, which are either in fluid or fluidized form or can be liquified or fluidized. Polyvinyl chloride, polystyrene and polyethylene scrap are examples of such plastic wastes, e.g., polyethylene scrap can be degraded to a low molecular weight liquid-type or heavy oil-type composition, which can be cracked in subject reactor to ethylene yields approaching 60% or more.

We claim:

1. A process for cracking hydrocarbon feedstocks consisting essentially of introducing a mixture of feedstock and hot gas into a reactor in which cracking temperatures are maintained, said reactor comprising:
   A. a hollow cylindrical tube having (i) a first end closure and a second end closure, at least one of said end closures being provided with an orifice disposed substantially centrally therein; and (ii) at least one hollow inlet feed chamber open at both ends passing through the cylindrical surface described by tube (A), one end of said feed chamber being disposed in the interior of the tube at about its periphery in such a manner that vapor, which is passed through said chamber, will flow substantially tangentially to the inner surface described by cylindrical tube (A), provided that rate of flow is sufficient therefor, creating a vortex-like flow within tube (A); and
   B. at least one hollow tube open at both ends; wherein:
      a. one end of tube (B) is connected to tube (A) at about its orifice in substantially concentric alignment therewith and in open communication with tube (A);
      b. tube (A) has a length to diameter ratio of about 0.01:1 to about 1:1,
      c. the ratio of the equivalent diameter of the orifice of tube (A) to the equivalent diameter of tube (B) is about 1:1 to about 0.1:1;
      d. tube (B) has a length to equivalent diameter of about 5:1 to about 200:1; and
      e. the ratio of the volume of tube (A) to the volume of tube (B) is about 0.1:1 to about 5:1;
   quenching the effluent from the reactor, and recovering the products of cracking.

2. The process defined in claim 1 wherein in the reactor the first end closure is provided with the orifice and the there is one tube (B) connected to tube (A) at about said orifice.

3. The process defined in claim 1 wherein in the reactor both end closures are provided with an orifice and two tubes (B) are connected to tube (A), one tube (B) at about each orifice.

4. The process defined in claim 2 wherein in the reactor:
   b. tube (A) has a length to diameter ratio of about 0.3:1 to about 1:1,
   c. the ratio of the equivalent diameter of the orifice of tube (A) to the equivalent diameter of tube (B) is about 1:1 to about 0.25:1;
   d. tube (B) has a length to equivalent diameter ratio of about 10:1 to about 100:1; and
   e. the ratio of the volume of tube (A) to the volume of tube (B) is about 100:1 to about 2.5:1.

5. The process defined in claim 3 wherein in the reactor
   b. tube (A) has a length to diameter ratio of about 0.03:1 to about 1:1;
   c. the ratio of the equivalent diameter of the orifice of tube (A) to the equivalent diameter of tube (B) is about 1:1 to about 0.25:1;
   d. tube (B) has a length to equivalent diameter ratio of about 10:1 to about 100:1; and
   e. the ratio of the volume of tube (A) to the volume of tube (B) is about 0.1:1 to about 2.5:1.

6. The process defined in claim 2 wherein in the reactor the inlet feed chamber is a cylindrical tube, the theoretical axis of which is in essentially tangential alignment with the inner surface described by tube (A).

7. The process defined in claim 4 wherein in the reactor the inlet feed chamber is a cylindrical tube, the theoretical axis of which is in essentially tangential alignment with the inner surface described by tube (A).

* * * * *

UNITED STATES PATENT OFFICE
CERTIFICATE OF CORRECTION

Patent No. 3,959,401    Dated May 25, 1976

Inventor(s) Charles W. Albright and George E. Keller, II

It is certified that error appears in the above-identified patent and that said Letters Patent are hereby corrected as shown below:

Column 2, line 1, for "naptha" read -- naphtha --; line 26, for "is" read -- in --. Column 3, line 12, after "in" delete "the". Column 5, line 59, for "of" read -- or --. Column 10, line 13, for "0.1:1" read -- 0.01:1 --; line 18, before "there" delete "the"; line 27, for "0.3:1" read -- 0.03:1 --; line 34, for "100:1" read -- 0.01:1 --; line 45, for "0.1:1" read -- 0.01:1 --.

Signed and Sealed this twelfth Day of July 1977

[SEAL]

Attest:

RUTH C. MASON
Attesting Officer

C. MARSHALL DANN
Commissioner of Patents and Trademarks